United States Patent [19]
Cohen et al.

[11] Patent Number: 5,590,319
[45] Date of Patent: Dec. 31, 1996

[54] QUERY PROCESSOR FOR PARALLEL PROCESSING IN HOMOGENOUS AND HETEROGENOUS DATABASES

[75] Inventors: Gerald D. Cohen, New York; Ralph L. Stout, Brooklyn; Jay H. Edson, Woodside, all of N.Y.

[73] Assignee: Information Builders, Inc., New York, N.Y.

[21] Appl. No.: 167,764

[22] Filed: Dec. 15, 1993

[51] Int. Cl.⁶ .............................. G06F 17/30; G06F 13/00
[52] U.S. Cl. ........................................................ 395/604
[58] Field of Search ................................ 395/600, 200; 364/401, 419, 900

[56] References Cited

U.S. PATENT DOCUMENTS

| | | | |
|---|---|---|---|
| 4,974,191 | 11/1990 | Amirghodsi et al. | 364/900 |
| 5,197,005 | 3/1994 | Schwartz et al. | 364/419 |
| 5,255,368 | 10/1993 | Barry | 395/200 |
| 5,369,570 | 11/1994 | Parad | 364/401 |

*Primary Examiner*—Thomas G. Black
*Assistant Examiner*—Cheryl Lewis
*Attorney, Agent, or Firm*—Levine & Mandelbaum

[57] ABSTRACT

A query processor for parallel processing translates an input query which references data stored in one or more homogenous or heterogenous databases into a plurality of parallel output queries each of which is directed to a single one of the databases or a partition thereof. A runner combines the results of each of the output queries and integrates them into a single coherent answer set.

13 Claims, 7 Drawing Sheets

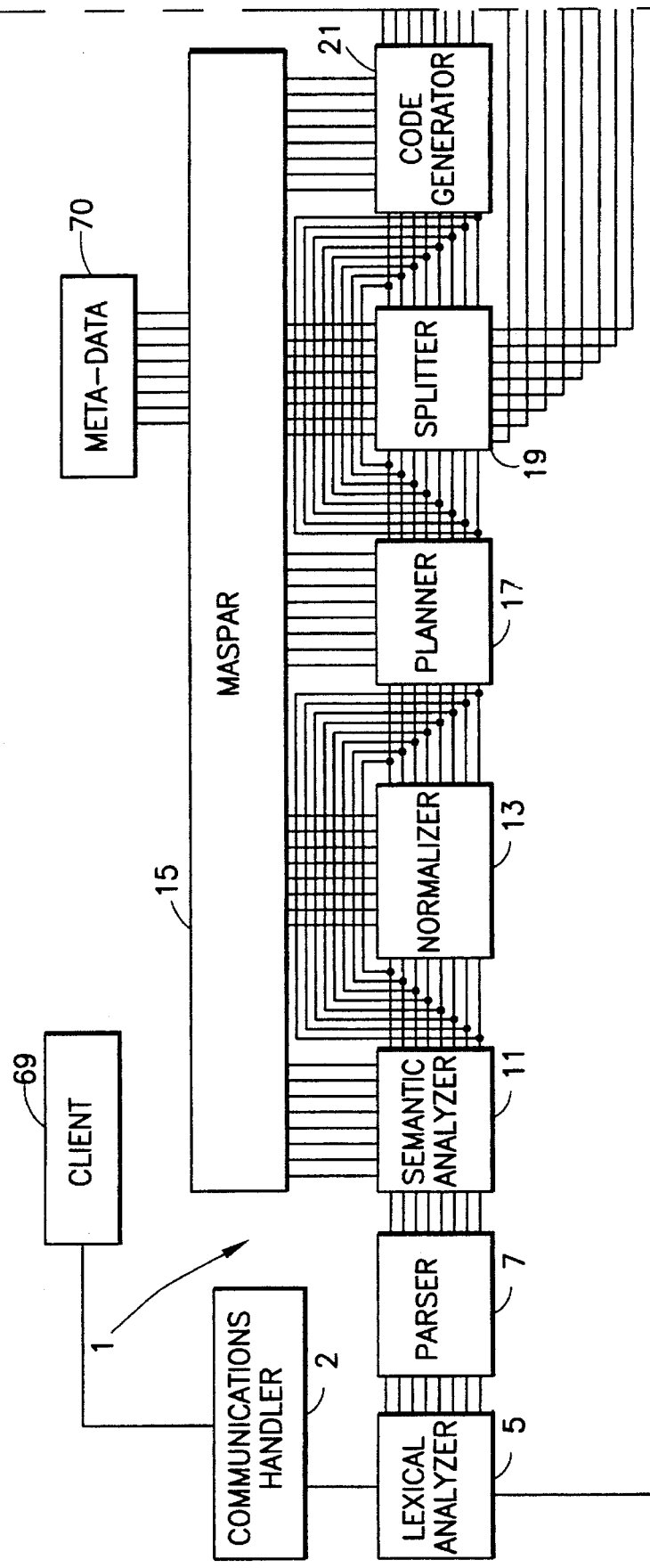

QUERY PROCESSOR FOR PARALLEL PROCESSING IN HOMOGENOUS AND HETEROGENOUS DATABASES

BACKGROUND OF THE INVENTION

It is known in the art of database management to organize and store data in electronically readable form for subsequent shared access by a multiplicity of computer users. Database engines enable a population of users to submit queries addressing such data, which is organized conceptually in relational, or tabular, form for convenience, and to receive in response an output table known as an answer set. Under adverse circumstances, answer sets take an inordinate amount of time to produce. As the tables comprising a database become larger, and the queries addressing them more complex, the time required to extract answer sets increases. This effect can be seen most dramatically in computer systems having a single processor. If it were generally possible, in the presence of many independent processors, to break requests into tasks that could be executed in parallel, database management systems could respond to even the most difficult queries in a reasonable time.

This is so for the same reason that ten men working on a job can complete it in one-tenth of the time providing they have equivalent skills and are able to share the work in an optimal fashion. Cooperating computer processors, like cooperating individuals, can not always function effectively in parallel. It often takes outside intervention to facilitate cooperation and, even then, the end result can only approach the ideal.

Consider, for example, a powerful computer system equipped with an unlimited supply of processors managing a database comprised of a single, monolithic, table. If, and this is very often the case, only one processor can use the table at one time, the power of the system is no greater than it would be if only one processor were available. This scenario is roughly analogous to the human situation in which ten workers are forced to share an important tool. At times only the person with the tool can work. The rest are forced to wait.

To make effective use of parallel processing computer database systems require outside intervention, primarily to encourage effective resource sharing amongst available processors. In part, this can be accomplished by breaking up large tables into small, disjoint, subsets to facilitate sharing. Suppose, for example, the customer file for a commercial establishment had grown very large, and assume that we wish to list those customers who have placed an order in the past month. Satisfying a query of this sort would normally require the database management system to scan the file from beginning to end extracting those records, or rows, exhibiting the desired characteristics, in this case evidence of a recent purchase. This could be a lengthy process. If the file were known to consist of ten non-overlapping subsets, the system could, in theory, assign ten processors to do the job. Each would scan one of the subsets and each would contribute part of the answer set. A controlling processor would be required to combine the intermediate results into a coherent result.

In this hypothetical situation, the actual structure of the information need not be known to the end user, who would prefer to view the customer file as a monolithic table. The ideal system would automatically take physical data partitioning into account when it processes a query, and it would do so without revealing this knowledge to its clientele. Of course, even under ideal conditions someone would have to determine the actual physical structure of the customer file.

The prior art has not produced a parallel processing database management system approaching the hypothetical ideal herein described for the following reasons. First, the most popular database management systems have had a long history. They are likely to have been conceived at a time when no premium was placed on parallel processing. Second, most actual data repositories are heterogeneous in nature. That is, the information base for a typical enterprise is, more likely than not, a composite of several dissimilar databases managed by jointly incompatable database management systems. In an environment in which no one system has the ability to coordinate the activities of the others, the parallel processing ideal posited here is difficult, if not impossible to realize. Third, adequate tools for partitioning files and tables to organize data in a fashion suited to parallel processing have been lacking.

SUMMARY OF THE INVENTION

The aforementioned problems of the prior art are overcome by the instant invention which provides apparatus for splitting a given query into a plurality of related queries which, when submitted to suitable independently functioning database management engines, produce information that can subsequently be transformed into the requested answer set. More specifically, the instant invention processes signals representing an input query addressing one or more tables, each of which may be physically partitioned into discrete subsets, by breaking the input query into a family of related queries addressing the aforementioned subsets, issuing each such related query to a database engine for processing, combining the resulting intermediate signals produced by the database engines into signals representing a combined answer set and producing the signals representing the combined answer set at its output terminal. The instant invention includes query processor means for analyzing and splitting queries, submitting queries to database engines, combining answer sets and producing suitable signals representing answer sets at its output port, meta-data analysis means having an input port for receiving signals representing a database table name and an output port for producing signals representing the structure of the table corresponding to the table name, translator means having one terminal operatively connected to the meta-data analysis means and a plurality of output ports, each adapted to be connected to an independent database engine and answer set aggregation means having a multiplicity of input terminals, each adapted to be connected to an independent database engine, through which signals representing intermediate answer sets are received, and an output port at which signals representing a combined answer set may be produced. The translator means includes lexical analysis means for breaking signals representing the text of a query into signals representing the sequence of tokens or words comprising the query, syntax analysis means for converting the signals generated by the lexical analysis means into signals corresponding to a tree representation of the query, semantic analysis means for refining the tree representation of the query and determining its meaning, normalizer means for re-expressing the tree prepared by the semantic analysis means in such a way as to remove all references to sets known as views which have no direct physical counterpart, planner means for determining how best to recast the input query as a family of related, but independently processable, queries, splitter means for expressing the plan generated by the planner means in the form of signals representing query trees and code generator means for converting queries expressed in the form of trees into queries expressed in the text form understood by the independently operating database engines.

It is an object of the invention to decrease the time required to process queries that address large databases by distributing the workload among many database engines that can run in parallel.

Another object of the invention is to provide a means for processing queries addressing one or more partitioned tables or files in parallel.

Still another object of the invention is to provide a means for processing queries addressing tables managed by an arbitrary collection of heterogeneous database management systems in parallel.

Other and further objects of the invention will become apparent from the following drawings and description of a preferred embodiment of the invention in which like reference numerals have been employed to indicate like parts.

DESCRIPTION OF THE PREFERRED EMBODIMENT

Figure 1:
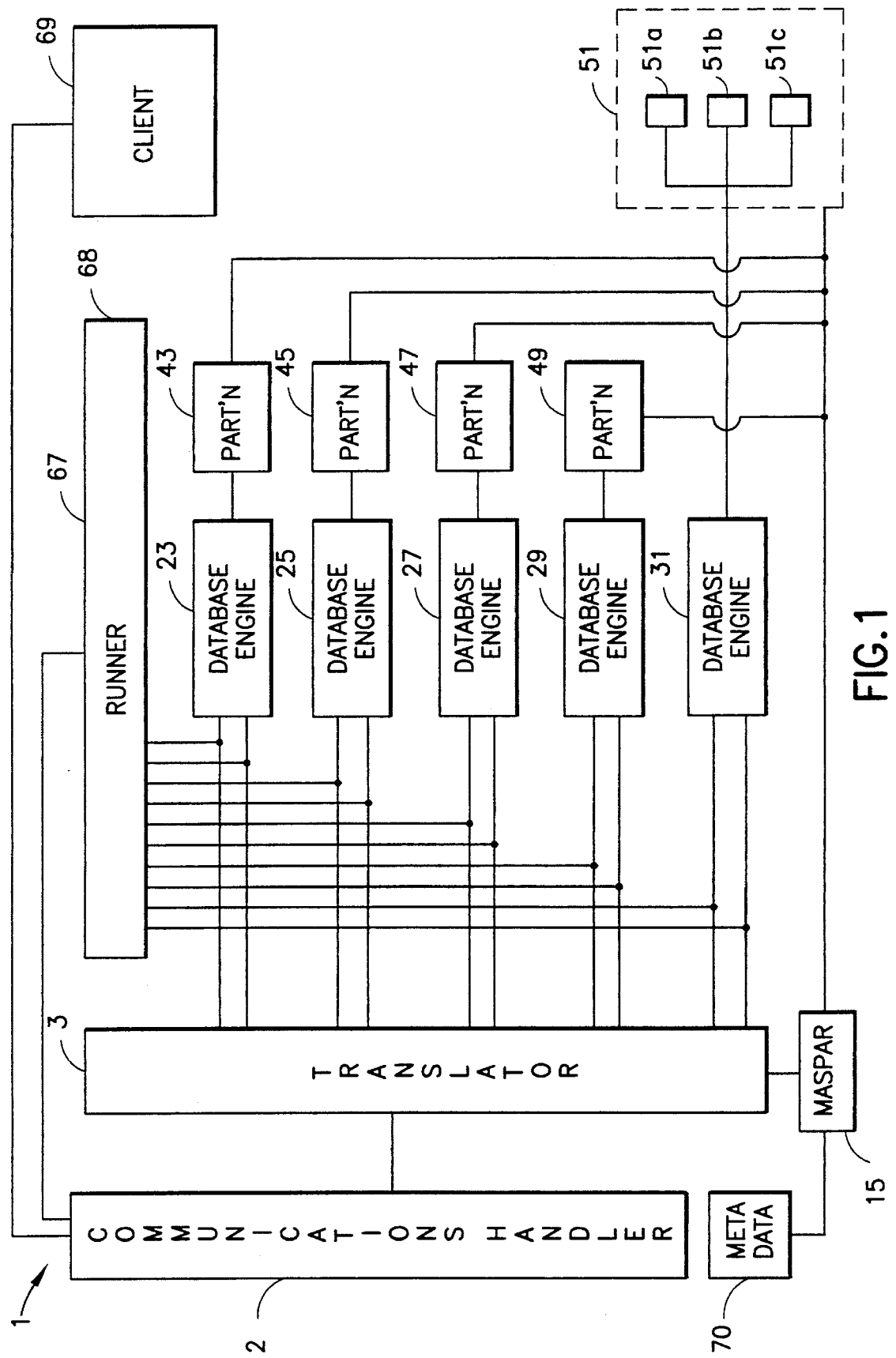
FIG. 1 is an overall schematic view of the apparatus of the preferred embodiment of the invention.

Referring now to FIG. 1 of the drawings there is shown a query processor 1 whose communications handler 2 receives signals representing a source query from a client 69. The source query, which can be expressed in the ANSI 1989 dialect of SQL, is shown addressing a database that has been decomposed into 7 partitions, 43, 45, 47, 49, and 51a, 51b, and 51c, four of the partitions 43, 45, 47, and 49, being mutually incompatible, and managed, respectively, by independent database engines, 23, 25, 27 and 29, and the remaining three partitions 51a, 51b, and 51c being incompatible with partitions 43, 45, 47, and 49 and managed by independent database engine 31. The communications handler 2 passes the query it receives to the translator 3, which recasts it in terms of base tables and transforms it into multiple SQL statements, each conforming to the language standards of the independent database engine that will eventually process it.

The signals generated by the translator typically represent many queries, each of which addresses information found within a single partition 43, 45, 47, 49, 51a, 51b, 51c, of the database and each of which conforms to the query language standards of the engine managing that partition. A given partition may be managed by one and only one of the engines 23, 25, 27, 29 and 31. Thus, database engine 23 manages partition 43, database engine 25 manages partition 45, database engine 27 manages partition 47, database engine 29 manages partition 49 and database engine 31 manages partitions 51a, 51b, 51c, and 51d.

A database engine requires at least one processor in order to function, but a given engine might have more than one processor at its disposal. The translator 3 may, therefore, direct multiple queries to database engine 31, which is shown presiding over multiple sub-partitions, 51a, 51b and 51c. Database engine 31 has many processors, and its component of the database has been partitioned to take advantage of parallel processing.

The database engines are not part of the invention. The invention serves to enhance the utility of the engines by making it possible for them to work together in an efficient fashion.

A meta-data database 70 contains a definition of the hardware environment, a description of the database as it is understood by the client 69, a description of the partitioned structure of the database and a definition of the relationship between individual partitions and database engines. Information stored in the metadata database is used by the translator 3, which sends signals representing specific requirements to a Master File Parser (MASPAR) module 15. MASPAR 15 responds to such requests with signals representing the requisite meta-data. Many such exchanges between the translator 3 and MASPAR 15 may be required to process a single source query.

The application of an output query to a participating database engine 23, 25, 27, 29 or 31, triggers the production of an intermediate answer set. Each participating database engine generates a result signal representing an intermediate answer set and directs the result signal to a runner 67, which in turn produces a final result signal satisfying the source query, and directs that signal to the communications handler 2 which, in turn, sends the result signal to the client 69.

Initially, the translator 3 transforms the source query into signals representing a tree structure. Consider the following SQL source query:
SELECT KEYCOLS, KEYNAME
FROM SYSTEM.SYSKEYS
WHERE KEYNAME='Fred'
ORDER BY KEYCOLS The translator reduces this to a J-tree, represented below as an indented list. The nodes that comprise the list contain a major and a minor operation code and are written in the form, operation: sub-operation.

| Node Description | Comment |
| --- | --- |
| SELOP:NOOP | SELECT Node (the root) |
|   SCOLSOP:NOOP | Column list Node |
|     QNAMEOP:NOOP | 1st Column Reference |
|       IDENT:KEYCOLS | an SQL identifier |
|     QNAMEOP:NOOP | 2nd Column Reference |
|       IDENT:KEYNAME | an SQL identifier |
|   FROMOP:NOOP | FROM Clause Node |
|     QNAMEOP:NOOP | 1st Table Ref. |
|       IDENT:SYSTEM | Table Qualifier |
|       IDENT:SYSKEYS | Table Name |
|   emptynode | |
|   WHEREOP:NOOP | WHERE Clause Node |
|     EQLOP:NOOP | "=" Comparison |
|       QNAMEOP:NOOP | Left Operand Node |
|         IDENT:KEYNAME | Name of Operand |
|       STRNG:'FRED; | Right Operand Node |
|   ORDEROP:NOOP | ORDER Clause Node |
|     QNAMEOP:NOOP | 1st Column Ref. |
|       IDENT:KEYCOLS | Column Name |

The translator 3 also obtains from the MASPAR 15 information about the structure of the database file containing the information that is being referenced, i.e., SYSTEM.SYSKEYS, and constructs a J-tree representation of this file which is stored as a single segment file having 11 fields as follows.

| Node Description | Comment |
| --- | --- |
| EN_USERID:SYSTEM | Table name |
|   EN_SEGMENT:SQLOUT | Segment within table |
|     EN_FIELD:TNAME | Field (1) within segment |
|       EN_ALIAS:E01 | Alias for field (1) |
|     EN_FIELD:TCREATOR | Field (2) |
|       EN_ALIAS:E02 | Alias (2) |
|     EN_FIELD:KEYTYPE | Field (3) |
|       EN_ALIAS:E03 | Alias (3) |
|     EN_FIELD:KEYNAME | Field (4) |
|       EN_ALIAS:E04 | Alias (4) |
|     EN_FIELD:KEYCOLS | Field (5) |
|       EN_ALIAS:E05 | Alias (5) |
|     EN_FIELD:INAME | Field (6) |
|       EN_ALIAS:E06 | Alias (6) |
|     EN_FIELD:REFTNAME | Field (7) |
|       EN_ALIAS:E07 | Alias (7) |
|     EN_FIELD:REFTCREATOR | Field (8) |
|       EN_ALIAS:E08 | Alias (8) |
|     EN_FIELD:DELETERULE | Field (9) |
|       EN_ALIAS:E09 | Alias (9) |
|     EN_FIELD:STATUS | Field (10) |
|       EN_ALIAS:E10 | Alias (10) |
|     EN_FIELD:TIMESTAMP | Field (11) |
|       EN_ALIAS:E11 | Alias (11) |

At this point, the translator 3 consults its meta-data files and finds that SYSTEM.SYSKEYS is partitioned into SYSTEM.SYSKEYS1 and SYSTEM.SYSKEYS2. Each partition has an associated set membership condition. The system generates an SQL query corresponding to the first such condition as follows.
SELECT X FROM Y WHERE
(KEYNAME>='MM') AND
((KEYNAME<>'MM') OR (KYCOLS>=3))

The query may be expressed in terms of dummy column and table names, "X" and "Y", because only the WHERE clause is of consequence. A parser, more fully described below, reduces the query to the following tree structure.

| Node Description | Comment |
| --- | --- |
| SELECT SELOP | The root node |
|   SCOLSOP | Dummy SELECT list |
|     QNAMEOP | |
|       QNAMEPART IDENT X | |
|   FROMOP | Dummy FROM clause |
|     QNAMEOP | |
|       QNAMEPART IDENT Y | |
|   EMPTYNODE | |
|   WHEREOP | The split condition |
|     ANDOP | AND |
|       GEQOP | >= |
|         QNAMEOP | left operand of >= |
|           QNAMEPART IDENT KEYNAME | |
|         LITSTRING STRNG 'MM' | right operand of >= |
|       OROP | OR |
|         NE NEQOP | <>, left opr of OR |
|           QNAMEOP | left operand of <> |
|             QNAMEPART IDENT KEYNAME | |
|           LITSTRING STRNG 'MM' | |
|         GEQOP | >=, right opr of OR |
|           QNAMEOP | left opr of >= |
|             QNMAEPART IDENT KEYCOLS | |
|           LITINT FIXED 3 | right opr of >= |

The forgoing specifies the condition predicate for the first partition, SYSTEM.SYSKEYS1 of the database SYSTEM.SYSKEYS. The "WHEREOP" subtree of this tree is then merged ("ANDed") with the tree representing the input query. This results in a new tree containing the following "WHEREOP" subtree.

| Node Description | Comment |
| --- | --- |
| WHEREOP:NOOP | Root of sub-tree |
|   ANDOP:NOOP | AND (a) |
|     ANDOP:NOOP | AND (b) |
|       GEQOP:NOOP | >= |
|         QNAMEOP:NOOP | left opr of >= |
|           IDENT:KEYNAME | operand name |
|         STRNG:'MM' | right opr of >= |
|       OROP:NOOP | OR (a) |
|         OROP:NOOP | OR (b), left opr of (a) |
|           LESSOP:NOOP | <, left opr of (b) |
|             QNAMEOP:NOOP | left opr of < |
|               IDENT:KEYNAME | Operand name |
|             STRNG:'MM' | right opr of < |
|           GRTROP:NOOP | >, right opr of (b) |
|             QNAMEOP:NOOP | left opr of > |
|               IDENT:KEYNAME | Operand name |
|             STRNG:'MM' | right opr of > |
|         GEQOP:NOOP | >=, right opr of (a) |
|           QNAMEOP:NOOP | left opr of >= |
|             IDENT:KEYCOLS | Operand name |
|           FIXED:3 | right opr of >= |
|   EQLOP:NOOP | =, right opr of a |
|     QNAMEOP:NOOP | left opr of = |
|       IDENT:KEYNAME | Operand name |
|     STRNG:'FRED' | right opr of = |

The foregoing tree will not contribute to the end result due to an incompatibility between the conditions KEYNAME>= 'MM' and KEYNAME=FRED. Hence, this particular split query is slated to be removed from consideration, i.e., pruned from the tree, since it can not contribute to the answer to the input query.

The translator now examines the set membership condition, i.e., condition predicate, for the second partition, SYSTEM.SYSKEYS2, which is stated in SQL as:

```
SELECT X FROM Y WHERE
(KEYNAME <= 'MM')
AND
((KEYNAME <>'MM') OR (KEYCOLS <3));
```

The translator 3 parses the foregoing query to produce another "WHEREOP" subtree and merges (ANDs) it with the sub-tree of the input query to obtain the following tree.

| Node Description | Comment |
| --- | --- |
| SELOP:NOOP | The root |
|   SCOLSOP:NOOP | Column list node |
|     QNAMEOP:NOOP | 1st column reference |
|       IDENT:KEYCOLS | Column name |
|     QNAMEOP:NOOP | 2nd column reference |
|       IDENT:KEYNAME | Column name |
|   FROMOP:NOOP | FROM clause node |
|     QNAMEOP:NOOP | 1st table reference |
|       IDENT:SYSTEM | Qualifier |
|       IDENT:SYSKEYS2 | Table name (2nd part) |
|   emptynode | |
|   WHEREOP:NOOP | WHERE clause node |
|     ANDOP:NOOP | AND (a) |
|       ANDOP:NOOP | AND (b) |
|         LEQOP:NOOP | <=, left of opr of b |
|           QNAMEOP:NOOP | left opr of <= |
|             IDENT:KEYNAME | name of operand |
|           STRNG:'MM | right opr of <= |
|         OROP:NOOP | OR |
|           NEQOP:NOOP | <>, left opr of OR |
|             QNAMEOP:NOOP | left opr of <> |
|               IDENT:KEYNAME | operand name |
|             STRNG:'MM' | right opr of <> |
|           LESSOP:NOOP | <, right opr of OR |
|             QNAMEOP:NOOP | left opr of < |

-continued

| Node Description | Comment |
| --- | --- |
|       IDENT:KEYCOLS | name of operand |
| FIXED:3 | right opr of < |
| EQLOP:NOOP | =, right opr of a |
|     QNAMEOP:NOOP | left opr of = |
|       IDENT:KEYNAME | name of operand |
|       STRNG:'FRED' | right opr of = |

This tree contributes to the end result. The translator 3 then prunes the tree and transforms the resulting WHERE clause to obtain the following WHERE clause sub-tree.

| Node Description | Comment |
| --- | --- |
| WHEREOP:NOOP | WHERE clause node |
|   ANDOP:NOOP | AND (a) |
|     ANDOP:NOOP | AND (b) |
|       LEQOP:NOOP | <=, left opr of b |
|         QNAMEOP:NOOP | left opr of <= |
|           IDENT:KEYNAME | name of operand |
|         STRNG:'MM' | right opr of <= |
|       OROP:NOOP | OR (c), right opr of b |
|         OROP:NOOP | OR (d), left opr of c |
|           LESSOP:NOOP | <, left opr of d |
|             QNAMEOP:NOOP | left opr of < |
|               IDENT:KEYNAME | operand name |
|             STRNG:'MM' | right opr of < |
|           GRTROP:NOOP | >, right opr of d |
|             QNAMEOP:NOOP | left opr of > |
|               IDENT:KEYNAME | operand name |
|             STRNG:'MM' | right opr of > |
|         LESSOP:NOOP | right opr of c |
|           QNAMEOP:NOOP | left opr of < |
|             IDENT:KEYCOLS | operand name |
|           FIXED:3 | right opr of < |
|   EQLOP:NOOP | =, right opr of a |
|     QNAMEOP:NOOP | left opr of = |
|       IDENT:KEYNAME | operand name |
|     STRNG:'FRED' | right opr of = |

From the above tree, the translator 3 produces the following SQL query.

```
SELECT KEYCOLS ,KEYNAME
FROM SYSTEM.SYSKEYS
WHERE
(KEYNAME <='MM') AND
((KEYNAME <>'MM') OR (KEYCOLS <3))
AND
(KEYNAME = 'FRED')
```

This SQL output query is applied to SYSTEM.SYS-KEYS2, the second partition. The system wastes no time searching SYSTEM.SYSKEYS1.

Figure 2B:
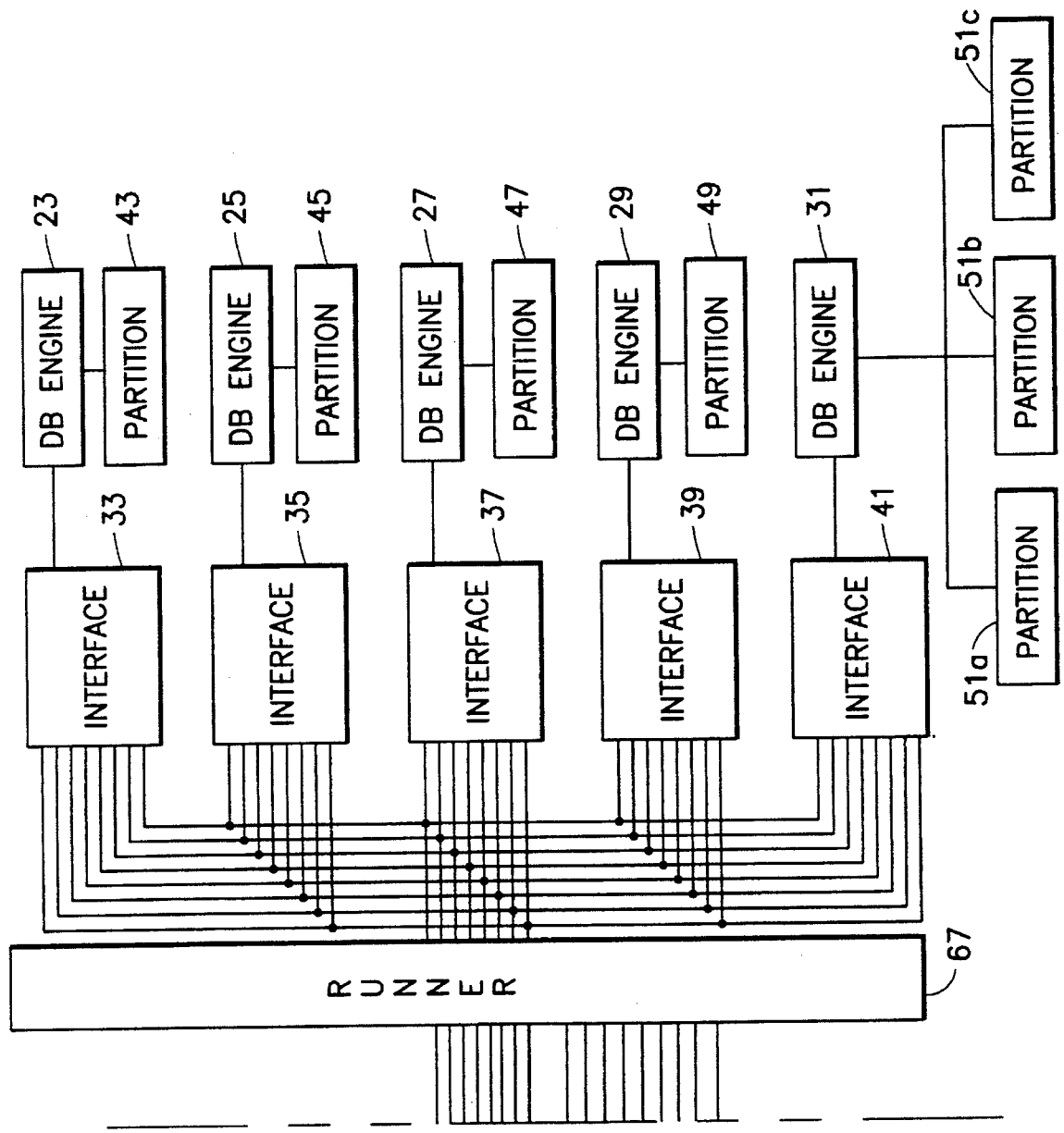
FIG. 2 is a detailed schematic view of the apparatus of the preferred embodiment of the invention.

The query processor 1 of the invention will now be described in greater detail with particular reference to FIG. 2. The translator 3 comprises a lexical analyzer 5, a parser 7, a semantic analyzer 11, a normalizer 13, a planner 17, a splitter 19 and a code generator 21. As will be known to those skilled in the art, each of these components may be realized on a computer processor having associated random access memory. A server computer may be configured to perform the functions of these components, to receive a query from a client computer 69, process it in accordance with the invention and return the answer set specified by the query to the client computer 69.

The lexical analyzer 5 transforms digital signals representing the text of an SQL query to digital signals representing a sequence of SQL tokens and passes them, on request, to the parser 7. There are many kinds of SQL tokens: character string literals, delimited identifiers, special characters, relational operators, numeric literals, national character strings, identifiers and key words. The lexical analyzer 5 extracts the next word or other significant symbol of the SQL language from the source query string when it receives a signal from the parser and delivers signals representing the aforementioned word or symbol to the parser 7. The parser 7, having received and analyzed the tokens comprising the source query, constructs an abstract syntax tree (AST) depicting the source query and directs signals representing that AST to the semantic analyzer 11 for further processing.

The semantic analyzer 11 scans the AST and constructs from the information contained therein another representation of the source query hereinafter referred to as a "J-tree." The J-tree encapsulates the latent information contained in the source query in a form suitable for manipulation in a computer memory. The semantic analyzer 11 determines whether the source query is consistent with the database schema encoded in the meta-data database 70 before it permits the translation process to continue. It rejects all queries that do not conform to the semantic rules of SQL.

Query validation requires the services of MASPAR 15 which, upon receipt of the appropriate signals, assembles signals representing the database objects referenced in the J-tree. MASPAR 15 contains circuitry for comparing the table and column names found in the J-tree with table and column names found in the meta-data database. For each table or column reference signal it receives, MASPAR 15 returns either a "not found" signal or a signal representing the internal structure of the database object corresponding to the table or column name. The semantic analyzer 11 uses the signals generated by MASPAR 15 in this context both to validate the query and to augment selected nodes of the J-tree with additional information.

Having accepted the source query, the semantic analyzer 11 passes a signal to the normalizer 13, which ensures that the query represented by the J-tree at that moment has been expressed soley in terms of base tables. SQL queries may reference two kinds of tables: base tables, the contents of which are actually recorded on external digital storage media, and views, which have no direct physical representation. A view, in SQL terminology, is an object defined in terms of any number of other base tables and views that retains the important characteristics of a base table. Since the planner 17, splitter 19 and code generator 21 require information about base table partitions, view references must be systematically replaced by equivalent base table references before the planner 17, splitter 19 and code generator 21 can perform their respective functions.

Figure 3:
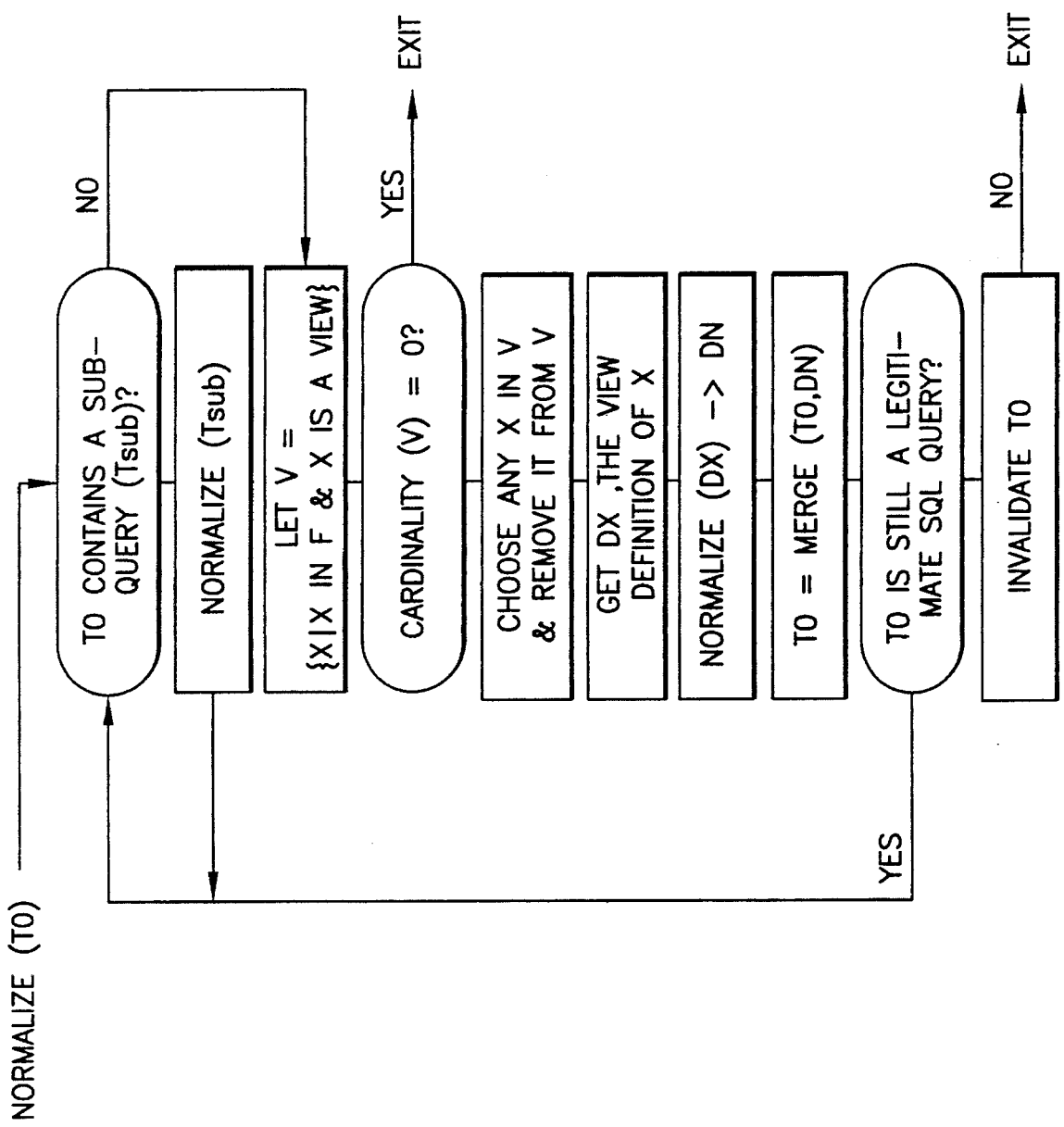
FIG. 3 is a flowchart depicting the operation of a component of the invention.

The operation of the normalizer is illustrated in FIG. 3 with the assumption that a J-tree, T0, exists and that the FROM list of T0 contains a set, v, of view references. The procedure first invokes itself recursively to process nested SELECT sub-trees of T0. Having normalized all such nested SELECTS, the procedure considers every remaining view reference x in v, replacing each with one or more table references. This step entails recursively normalizing the view definition, dx, of x and merging T0 and dx. The merge step, shown as a single box in FIG. 3 involves substituting the view column references with corresponding table column references taken from dx, replacing the view reference, x, with the entire FROM sub-tree of dx and ANDing the WHERE sub-tree of dx with that of T0. Should dx contain contain a GROUP BY subtree, the normalizer 13 ANDs the corresponding HAVING sub-tree with the WHERE sub-tree of dx. To avoid introducing ambiguous references, the normalizer 13 replaces all column references in T0 and dx with uniquely qualified column references. Should this process generate an operation that can not be performed, the normalizer 13 rejects the query rather than continuing.

The normalization process is illustrated by the following example. Intermediate results, which are shown here in flattened text form for readability, should be understood to describe J-trees.

View Definitions:

CREATE VIEW SALES
  (PNAME, PCODE, PDESCR, PCOST, VOL, REGION, MONTH) AS
  SELECT P.PNAME, S.PCD, P.PDESCR, P.PCOST, S.VOL, S.REG, S.MON FROM SALES_BASE S, PROD_BASE P WHERE S.PCD=P.PCD;
CREATE VIEW HIGHLIGHTS AS
  SELECT PNAME, PCODE, VOL, REGION, MONTH FROM SALES WHERE VOLUME>(SELECT AVG(VOL) FROM SALES WHERE MONTH='DEC');
CREATE VIEW OUR_SALES (PRODUCT_NAME, PRODUCT_CODE, VOLUME) AS
SELECT * FROM HIGHLIGHTS
WHERE REGION IN ('Hither', 'Yon');

Sample Query (T0):

SELECT, FROM OUR_SALES
  WHERE PRODUCT_NAME LIKE '%cycle';

The Normalization of T0 takes place as follows. The normalizer 13 retrieves the "CREATE VIEW OUR_SALES . . ." statement, reduces the statement to a J-tree, T1, and normalizes the tree by calling itself recursively. Initially, T1, takes the following form: SELECT * FROM HIGHLIGHTS WHERE REGION IN ('Hither', 'Yon');

In the process of normalizing T1 the system must access another view definition, T2. Initially, T2 takes the following form:
SELECT PNAME, PCODE, VOL, REGION, MONTH
FROM SALES
WHERE VOLUME>
  (SELECT AVG(VOL) FROM SALES
   WHERE MONTH='DEC');

T2 contains a sub-query, T3, that must be normalized. But T3 is also cast in terms of a view. The normalizer 13 accesses the SALES view definition and converts it into yet another J-tree, T4. Initially, T4 takes the following form:
SELECT P.PNAME, S.PCD, P.PDESCR, P.PCOST, S.VOL, S.REG, S.MON
FROM SALES_BASE S, PROD_BASE P
WHERE S.PCD=P.PCD Since T4 is in normal form, it can be merged with T3 to produce a new version of T3:
SELECT AVG(S.VOL) FROM SALES_BASE S, PROD_BASE P
WHERE (S. PCD=P. PCD ) AND (S. MONTH='DEC');

T2, once it has been normalized, has the following appearance:
SELECT PNAME, PCODE, VOL, REGION, MONTH
FROM SALES
WHERE VOLUME>
  (SELECT AVG(VOL) FROM SALES_BASE S1, PROD_BASE P1
   WHERE (S1.PCD=P1.PCD) AND (MONTH='DEC'));

But T2 still contains a reference to the SALES view, T4. Merging and T2 and T4 produces another T2 revision:
SELECT P2.PNAME, S2.PCD, S2.VOL, S2.REG, S2.MON FROM SALES_BASE S2, PROD_BASE P2 WHERE
(S2.PCD=P2.PCD) AND
(S2.VOLUME>(SELECT AVG(VOL) FROM SALES_BASE S1, PROD_BASE P1 WHERE (S1.PCD= P1.PCD) AND (MONTH='DEC'));

Merging this with T1 yields T1 in its final form: SELECT P2.PNAME, S2.PCD, S2.VOL, S2.REG, S2.MON FROM SALES_BASE S2, PROD_BASE P2 WHERE
(S2. PCD=P2. PCD) AND
(S2.VOLUME>
(SELECT AVG(S1.VOL) FROM SALES_BASE S1, PROD_BASE P1 WHERE (S1.PCD=P1.PCD) AND (MONTH='DEC')) AND
(S2.REGION IN ('Hither', 'Yon'));

When it has completed its work, the normalizer 13 signals the splitter which partitions the source query into independently executable units. The splitter bases its decisions on meta-data descriptions which, by this time, have been brought into memory and stored in a variant of J-tree used to retain such information. If the source query addresses only monolithic tables or is thought to be optimal as it stands, the system makes no attempt to split it. The splitter 19 breaks divisible queries into tasks that can take place in parallel. A normalized J-tree is considered to be a candidate for decomposition if (1) any base table, T, referenced in its FROM subtree is the union of multiple, disjoint, SQL union-compatible base tables, (2) any base table referenced in its FROM sub-tree has been partitioned into disjoint subsets on the basis of key field ranges or (3) its root node contains a union operator. The system processes SQL UNION statements in parallel even if the individual queries that comprise the union cannot be decomposed.

Figure 4A:
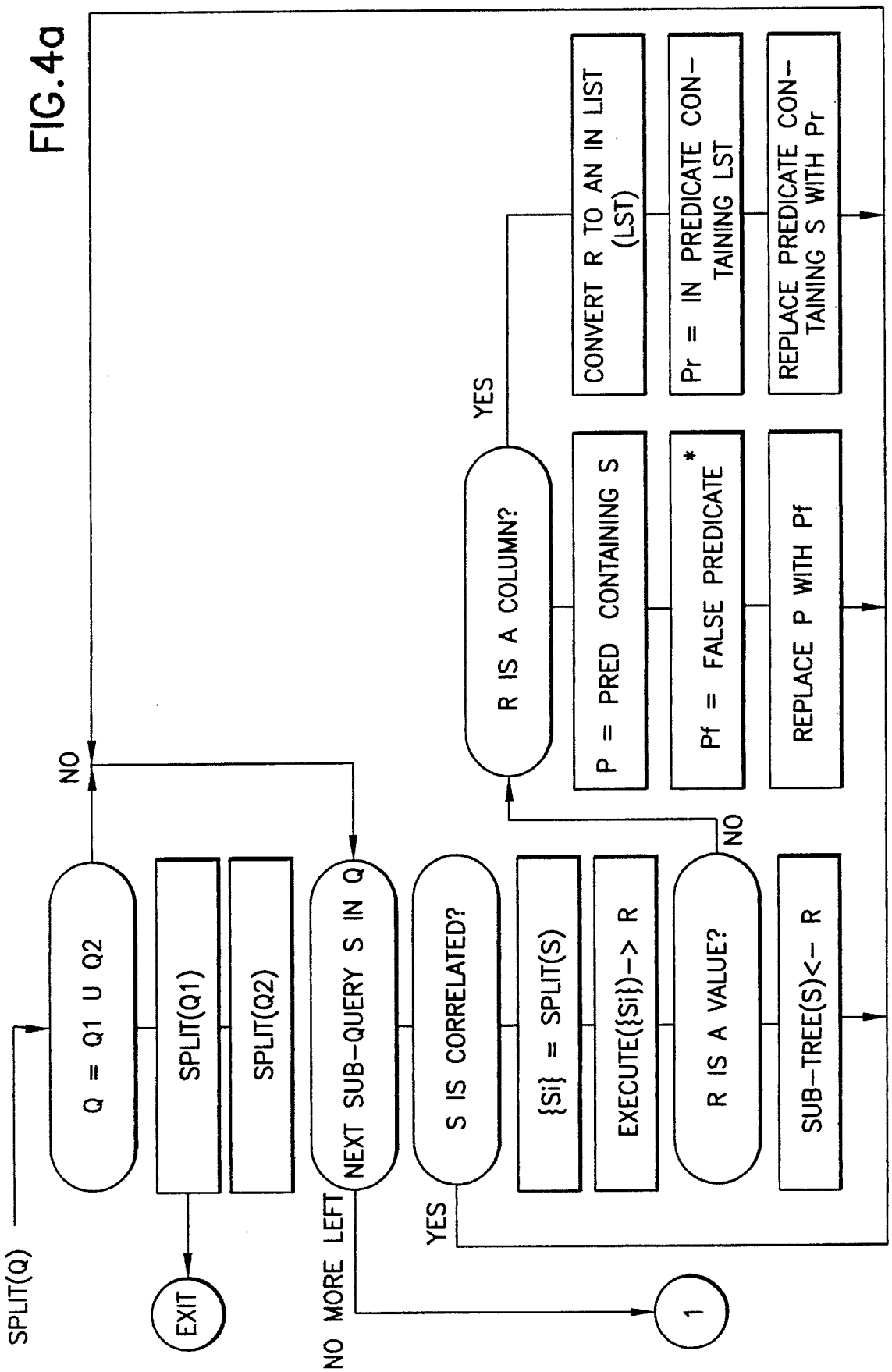
FIGS. 4a, 4b and 4c form a flowchart depicting the operation of another component of the invention.
Figure 4B:
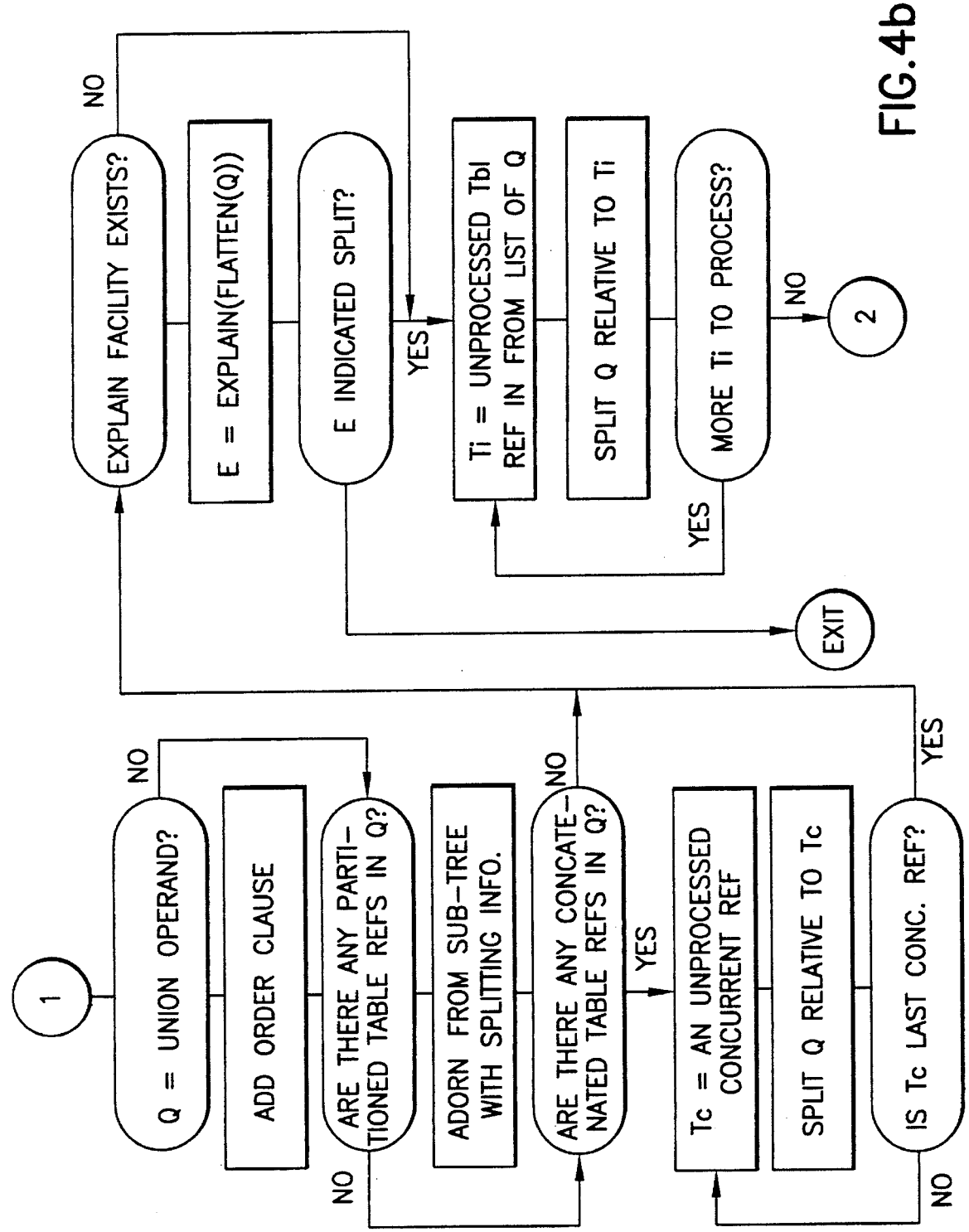
Figure 4C:
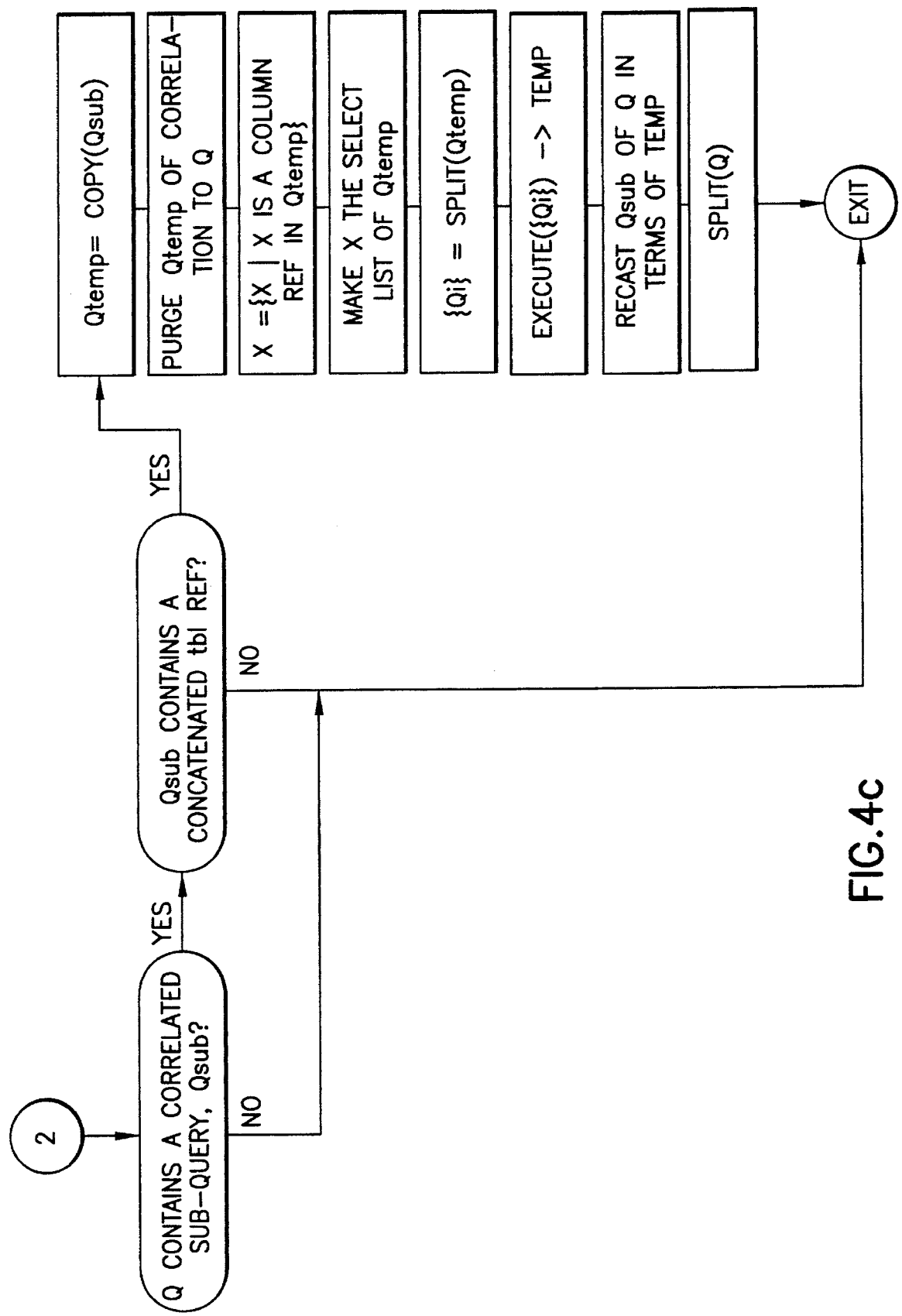

FIGS. 4a, 4b, and 4c depict the overall logic of the splitter, which begins by determining whether J-tree Q (FIG. 4a) represents a UNION operation. If it does, the splitter invokes itself recursively to partition both branches of the tree. Note that if additional UNION operations were embedded in either branch of the tree, the splitter would detect them and, once again, invoke itself recursively to partition each branch. Since UNION operations must, by definition, occur at a higher level than SELECT operations, this strategy effectively removes UNIONS from consideration before the SELECT node is detected.

Having dispensed with UNIONs, the splitter 19 scans for subqueries, constructs which may have been employed to specify individual values or columns of values in the predicate. SQL defines two kinds of sub-queries: correlated and uncorrelated. Correlated sub-queries require special handling because they cannot be evaluated independently of the query in which they are embedded. The splitter attempts to replace every uncorrelated subquery with a value or column of values before continuing. This entails (1) detecting an uncorrelated sub-query, Qs, (2) splitting Qs, (3) executing Qs and (4) recasting the Qs sub-tree in terms of literal values. Thus, the subtree representing "A=(SELECT AVG(Age) FROM Personnel" might be replaced by the equivalent of "A=37" and the subtree representing "X IN (SELECT ModelNumber FROM Products WHERE Qty_On_Hand<100)" might be replaced by the equivalent of "X IN (100, 221, 085)".

IN lists, because their size can not be known apriori, present a special problem. If the number of elements exceeds a DBMS-dependent threshold, the splitter must store them in a temporary table, Tmp, for example, and replace the predicate in question with the equivalent of 'X IN (SELECT * FROM Tmp)".

A false predicate, as referred to in FIG. 4a, is an SQL predicate containing an inexpensive sub-query that is guaranteed to produce a suitable result. For example "1=SELECT 2 FROM EMPTYTABLE".

Once all uncorrelated sub-queries have been replaced, the splitter examines the FROM list of the J-tree. FROM lists, at this stage in the process, can contain an unspecified number of table references (view references have already been replaced by the normalizer 13). References to "concatenated" tables, the components of which are seen as separately addressable tables by participating DBMSs, and "partitioned" tables, which are not, must be treated differently.

A query containing a concatenated table reference, T, always gives rise to one task for every component of T while a query containing a partitioned table reference need not be split at all. Thus, FIG. 4 shows Q being split relative to its concatenated table reference before invoking the DBMS-dependent "Explain" function (FIG. 4b). The Explain function, which may not necessarily be available, is a generic name for a facility that examines a proposed query and returns information about how a particular DBMS would process it. The system uses such information to determine (1) whether to split and (2) what partitioned table or tables in the FROM list can best be used as the basis for splitting. Query optimization at this level is highly DBMS-dependent and can only be brought into play when partitioned tables are addressed.

The logic illustrated in FIG. 4b is capable of splitting a query Q relative to every partitioned table it references. In practice, splitting is constrained by DBMS-dependent rules.

Finally, the splitter 19 looks for correlated sub-queries referencing concatenated tables. Such queries can not be processed as stated by the SQL DBMS engines because the engines are unaware of concatenated table names. Concatenated tables, which are logical entities, are defined as the union of one or more base tables. A DBMS can address the component parts of a concatenated table but not, as is required in the case of correlated sub-queries, the table as a whole. To solve the addressability problem the system must materialize the information required to satisfy the correlated sub-query and store it in a temporary table local to a selected DBMS. It attempts to do so by generating a suitably qualified SQL UNION request. It is crucial that the UNION operation produce answer sets of a manageable size. The system requests only those rows and columns that are required to evaluate the predicate under consideration. It derives the column list by enumerating column references in the correlated sub-query and forms a predicate by copying relevant conditions from its WHERE clause. Normally it is possible to guarantee a priori that the answer set produced in this fashion will be far smaller than a straightforward materialization of the concatenated table in question. But if this is not the case, and the projected size of the intermediate result exceeds a user-defined threshold value, the splitter 19 aborts the source query and returns a diagnostic message to the client.

The correlated sub-query strategy for concatenated tables is illustrated by the following example. Consider the following query:
SELECT EName
FROM emp e1
WHERE Salary>
  (SELECT AVG(Salary)
  FROM emp e2
  WHERE e1. Dpt=e2.Dpt);

If emp were partitioned on Dpt N, queries of the following form could be generated. This is possible because e1.Dpt is known to be the same as e2.Dpt. Since Dpt is the partitioning key, the sub-query need can be evaluated without crossing subset boundaries.
SELECT EName
FROM emp e1[i]
WHERE Pred(e1[i]) AND
  Salary>
    (SELECT AVG(Salary)
    FROM emp e2[i]
    WHERE e1.Dpt=e2.Dpt AND pred(e2[i]));

But if emp is not partitioned on Dpt (i.e., the sub-query spans subset boundaries) the inner query can not be split. An intermediate table, T, defined as follows, must be introduced.
T(Dpt, Number, Amount)

Having created T, the query processor 1 then populates it with N result sets.

```
INSERT INTO T
    SELECT Dpt, SUM(VALUE(LENGTH(EName), 1)*0+1),
    SUM(Salary)
    FROM emp[1]
    GROUP BY Dpt
    HAVING COUNT(*) > 0;
INSERT INTO T
    SELECT Dpt, SUM(VALUE(LENGTH(EName), 1)*0+1),
    SUM(Salary)
    FROM emp[2]
    GROUP BY Dpt
    HAVING COUNT(*) > 0;
    . . .
INSERT INTO T
    SELECT Dpt, SUM(VALUE(LENGTH(EName), 1)*0+1),
    SUM(Salary)
    FROM emp[N]
    GROUP BY Dpt
    HAVING COUNT(*) > 0;
```

Once T is fully populated, the query processor issues N correlated queries of the form:
SELECT EName FROM emp [i]
WHERE emp. Salary>
  (SELECT SUM(T.Amount) / SUM(T.Number)
  FROM T
  WHERE emp. Dpt=T.Dpt);

Finally, the result sets are merged and T is dropped.

A split query must be issued for every component of a concatenated table reference. When the client calls for concatenated tables, T1, T2, . . . , Tn to be joined, for example, the query generator 1 is forced to generate a split query for every permutation and combination of the components of T1, T2, . . . , Tn. In consequence, the method depicted in FIGS. 4a, b, c is capable of deriving every possible split query from a given source request. The query generator can actually optimize performance by splitting the source request selectively. Selective splitting is possible for tables partitioned on split key ranges. For such tables, the splitter 19 identifies which queries are worth submitting for parallel execution by examining a set of DBMS-specific rules designed to optimize the overall performance of the system.

The following rules have been developed specifically for the IBM DB/2 DBMS engine. In the case of DB/2, the splitter 19 recognizes six general classes of SQL query (called Q below) for the purpose of split range key table parallelization:

(1) A UNION [ALL] query: Break n-way Union operations into n separate subordinate query specifications and split each of them individually.

(2) A simple ungrouped query (Q) with one table reference (T) in the FROM list, no HAVING clause and no correlated sub-queries: Providing T is composite, and the EXPLAIN data provides ample justification to proceed, split Q on the partitioning key of T as shown in the previous example.

(3) A simple grouped query whose GROUP BY specification is the partitioning key (or an ungrouped query with a HAVING clause): If T is composite, split Q relative to T.

(4) A 2-way join(T1 X T2): If T1 and T2 are partitioned m and n ways, respectively, the splitter 19 is capable of generating as many as m*n tasks. Do not attempt a two-way split unless DB/2 Explain data shows it to be advantageous. "Star" joins, in which all the join columns are partitioning keys (with identical range or subsetted boundaries), may be split into one replica per partition. For other queries, do an EXPLAIN on the source query and split on the partitioning key of the outer table, T1, of the join. If T2 happens to be partitioned on the same columns as T1 generate a 2-way split.

(5) An n-way join (T1×T2 . . . X Tj): The strategy for n-way joins is a generalization of the 2-way join strategy. In the concatenated case as many as n1, n2 . . ,nj queries could result. In the split key case, partition on the outermost table of the DB/2-selected join order and then expand to two-way partitioning in the event of a star join. Attempt to expand to three-way partitioning in the case of a second star join.

(6) A query, Q, with a correlated sub-query, SQ: do not split SQ unless it addresses a concatenated table. Limit splitting to the parent query.

When it completes its work the splitter 19 passes two signals, the address of the root node (r) of the J-tree and the address (d) of a descriptor list indicating how to produce many statements from r. The purpose of the code generator 21 is to generate signals representing the text of the SQL statements encoded by r and d.

To produce text, the code generator 21 traverses r in a top-to-bottom, left-to-right fashion, emitting the text of one or more tokens for every node it visits. For J-tree nodes representing column names in the select list, for example, the code generator 21 copies the identifier, suitably delimited, to its result string. Other nodes representing higher level constructs such as sub-selects and expressions require special treatment. Sub-selects, for example, might give rise to a leading "(" followed by the result of flattening the sub-select, followed by a closing")".

The code generator 21 suppresses HAVING clauses that have been marked as post-processing steps by the splitter 19. Assume a tree, T, representing the following grouped query is submitted to the code generator 21.
SELECT DEP_NBR, SUM(SALES) FROM SALES_INFO
WHERE REGION='East'
GROUP BY DEP_NBR
HAVING AVG (SALES)>100000, From this, the code generator 21 might produce the following text:
SELECT DEP_NBR, SUM(SALES), SUM(VALUE(LENGTH(COST),0+1,0))
FROM SALES_INFO
GROUP BY DEP_NBR;

Eventually, when the runner 67 receives intermediate answer sets, it merges the data, computes the aggregate functions, applies the suppressed HAVING clause and builds an answer set.

The runner 67 controls parallel query execution. It submits tasks to selected DBMSs, processes the result sets returned by participating DBMSs and produces answer sets satisfying the source query.

Like other components of the query processor 1 the runner 67 is driven by information organized in the form of a J-tree (T). Initially, the runner 67 traverses T, submitting a request for every query specification encoded by T. It issues SQL requests to selected DBMSs and awaits results. When the first row of an answer set arrives, it starts processing data.

What it does then depends on T. For an unsplit straightforward end-user request, the runner 67 relays output rows more or less unchanged to the client; for an unordered UNION ALL the runner 67 merges answer sets; for an ordered UNION, it is obliged to remove duplicates as it merges; for a query with a HAVING clause, it may apply SQL aggregate functions to column values; for a distributed join, it combines rows that satisfy a specified join condition; and finally, for an uncorrelated sub-query, the runner 67 writes a result (a value or file reference) into a designated memory location.

It is to be appreciated that the foregoing is a description of a preferred embodiment of the invention to which variations and modifications may be made without departing from the spirit and scope of the invention.

What is claimed is:

1. A query processor for parallel processing of first signals indicative of an input query referencing information stored in one or more databases each of which is accessible through an independent database engine, said input query specifying conditions for an answer set of said information, comprising, translator means for analyzing said first signals and transforming them into second signals representing queries each of which is directed to one or more base tables, splitter means for receiving said second signals and producing therefrom third signals corresponding to a plurality of separate queries capable of being executed independently and in parallel, each of said separate queries being compatible with one of said database engines, and runner means for applying said third signals simultaneously to respective ones of said database engines, receiving, in response thereto, fourth signals generated by each of said database engines which correspond to answer sets for the separate queries, and, producing fifth signals representing an answer set for said input query.

2. A query processor in accordance with claim 1, wherein said translator means further comprises lexical analysis means for transforming said first signals into fifth signals representing the sequence of tokens or words comprising the input query, said translator means further processing said fifth signals to produce said second signals.

3. A query processor in accordance with claim 2, wherein said translator means further comprises parser means for receiving said fifth signals and producing therefrom, sixth signals corresponding to an abstract syntax tree depicting the input query, said translator means further processing said sixth signals to produce said second signals.

4. A query processor in accordance with claim 3, further comprising meta-data means for generating seventh signals indicative of the structures of the database engines and the data accessible by them, wherein said translator means further comprises semantic analyzer means for comparing said sixth signals and said seventh signals, and producing therefrom eighth signals indicative of said input query only if the structures of the database engines and the data accessible by them are compatible with the input query, said translator means further processing said eighth signals to produce said second signals.

5. A query processor in accordance with claim 4, wherein said translator means further comprises normalizer means for receiving said eighth signals and producing therefrom, ninth signals corresponding to said input query cast in terms of base tables and without references to views, said translator means further processing said ninth signals to produce said second signals.

6. A query processor in accordance with claim 5, wherein said translator means further comprises planner means for receiving said ninth signals and producing in response thereto, tenth signals corresponding to one of a plurality of methods for recasting the input query as a family of related, but independently processable, queries, said translator means further processing said tenth signals to produce said second signals.

7. A query processor in accordance with claim 1, further comprising code generator means operatively connected to said splitter means for converting said third signals to correspond to text understood by said database engines.

8. A method of processing an input query referencing information stored in one or more databases each of which is accessible through an independent database engine, said input query specifying conditions for an answer subset of said information which is divisible into a plurality of component subsets, comprising, producing input query signals representative of said input query, producing database structure signals indicative of the structures of each one of said one or more databases, combining said input query signals and said database structure signals to produce a plurality of output query signals representing output queries each of which references the data in one of said databases or a partition thereof, and applying, in parallel, each of said output query signals only to the respective database or partition thereof referenced by its corresponding represented output query.

9. A method in accordance with claim 8, further comprising receiving component answer signals from each of said databases or partitions thereof and combining the component answer signals to produce a resultant answer signal.

10. A method in accordance with claim 9, further comprising comparing said input query signals with said database structure signals and determining whether said output query signals are to be produced, as a function of said comparison.

11. A method in accordance with claim 8 wherein said input query signals, and database structure signals represent respective trees having nodes, and further comprising producing signals indicative of tree representations of said output query signals.

12. A method in accordance with claim 11, further comprising normalizing said input query signals by removing references to views.

13. A method in accordance with claim 12, further comprising converting said signals indicative of trees representing said output queries to signals indicative of text.

* * * * *